(12) United States Patent
Prentice

(10) Patent No.: US 9,157,663 B2
(45) Date of Patent: *Oct. 13, 2015

(54) ADJUSTABLE SOLAR PANEL CAP AND METHOD OF MANUFACTURING SAME

(71) Applicant: James L. Prentice, North Hills, CA (US)

(72) Inventor: James L. Prentice, North Hills, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/460,704

(22) Filed: Aug. 15, 2014

(65) Prior Publication Data

US 2014/0352236 A1    Dec. 4, 2014

Related U.S. Application Data

(60) Division of application No. 14/102,264, filed on Dec. 10, 2013, now Pat. No. 8,813,532, which is a continuation of application No. 13/248,608, filed on Sep. 29, 2011, now Pat. No. 8,601,752.

(51) Int. Cl.
*H02B 1/40* (2006.01)
*H02B 1/48* (2006.01)
(Continued)

(52) U.S. Cl.
CPC ............... *F24J 2/5228* (2013.01); *E04D 3/405* (2013.01); *F24J 2/0427* (2013.01); *F24J 2/5235* (2013.01); *F24J 2/5245* (2013.01); *F24J 2/5249* (2013.01); *F24J 2/5264* (2013.01); *H01L 31/05* (2013.01); *H01L 31/18* (2013.01); *H02S 20/00* (2013.01); *Y02B 10/20* (2013.01); *Y02E 10/44* (2013.01); *Y02E 10/47* (2013.01); *Y02E 10/50* (2013.01); *Y10T 29/49355* (2015.01); *Y10T 29/51* (2015.01); *Y10T 29/5116* (2015.01)

(58) Field of Classification Search
CPC ........ H01L 31/18; H01L 31/05; F24J 2/0427; F24J 2/5264; F24J 2/5245; F24J 2/5235; F24J 2/5228; F24J 2/5249; E04D 3/405; Y02B 10/20; Y02E 10/44; Y02E 10/47; Y02E 10/50; Y10T 29/51; Y10T 29/5116; Y10T 29/49355; H02S 20/00
USPC .................... 52/173.1, 173.3, 200, 202, 208; 126/621–623
See application file for complete search history.

(56) References Cited

U.S. PATENT DOCUMENTS

| 1,989,059 A | 1/1935 | Kurtze |
| 2,240,548 A | 5/1941 | Cairns |

(Continued)

FOREIGN PATENT DOCUMENTS

| CH | 665968 A5 | 6/1988 |
| JP | 08120625 A * | 5/1996 |
| JP | 2001064919 A * | 3/2001 |

*Primary Examiner* — Jeanette E Chapman
(74) *Attorney, Agent, or Firm* — Kelly & Kelley, LLP

(57) ABSTRACT

A solar panel cap and light cap secured to a wall or parapet through the use of a fixed coping having two vertical supports on either side of a locking channel. The vertical supports are biased or resilient to secure the coping to the top of the parapet or wall. The locking channel is configured to slidably receive a locking insert from a solar panel cap or light cap, each configured to connect to an adjacent cap such that they are electrically coupled. The solar panel caps include a horizontal base and an angled solar panel pivotally attached on one edge to the horizontal base. Support plates are pivotally attached to opposite edges of both the horizontal base and the angled solar panel such that when they overlap and are secured to one another the angled solar panel is adjustably positionable relative to the horizontal base.

12 Claims, 12 Drawing Sheets

(51) Int. Cl.
  *F24J 2/52*    (2006.01)
  *H01L 31/18*   (2006.01)
  *E04D 3/40*    (2006.01)
  *F24J 2/04*    (2006.01)
  *H01L 31/042*  (2014.01)
  *H01L 31/05*   (2014.01)

(56) References Cited

U.S. PATENT DOCUMENTS

| | | |
|---|---|---|
| 2,321,637 A | 6/1943 | Watts |
| 2,471,490 A | 5/1949 | Mercer |
| 2,719,562 A | 10/1955 | Beegle |
| 2,986,193 A | 5/1961 | Howell |
| 3,456,472 A | 7/1969 | Balfanz, Jr. |
| 3,931,725 A | 1/1976 | Yon |
| 4,119,084 A | 10/1978 | Eckels |
| 4,299,108 A | 11/1981 | Kato et al. |
| 4,716,754 A | 1/1988 | Youngs |
| 5,239,791 A * | 8/1993 | Mills et al. ......................... 52/58 |
| 5,289,662 A * | 3/1994 | Castle ........................... 52/287.1 |
| 5,315,853 A | 5/1994 | Scheiterle |
| 5,425,259 A | 6/1995 | Coben et al. |
| 5,505,813 A | 4/1996 | Scheifele et al. |
| 5,551,272 A | 9/1996 | Knudson |
| 5,893,247 A * | 4/1999 | Hickman et al. ................. 52/300 |
| 5,946,961 A | 9/1999 | Stone |
| 5,983,691 A | 11/1999 | Voth et al. |
| 6,148,654 A | 11/2000 | Jensen et al. |
| 6,981,397 B2 | 1/2006 | Meyer |
| 7,018,063 B2 | 3/2006 | Michael et al. |
| 7,230,819 B2 | 6/2007 | Muchow et al. |
| 7,476,832 B2 | 1/2009 | Vendig et al. |
| 7,819,114 B2 | 10/2010 | Augenbraun et al. |
| 7,828,486 B1 | 11/2010 | Wong |
| 8,640,402 B1 * | 2/2014 | Bilge ........................... 52/173.3 |
| 2004/0148995 A1 | 8/2004 | Gilbert |
| 2006/0050528 A1 | 3/2006 | Lyons et al. |
| 2009/0320545 A1 | 12/2009 | Robins |
| 2011/0023867 A1 | 2/2011 | Muchow et al. |
| 2011/0138696 A1 | 6/2011 | Olson et al. |
| 2011/0162300 A1 | 7/2011 | Johnson |
| 2012/0181938 A1 | 7/2012 | Kay |

* cited by examiner

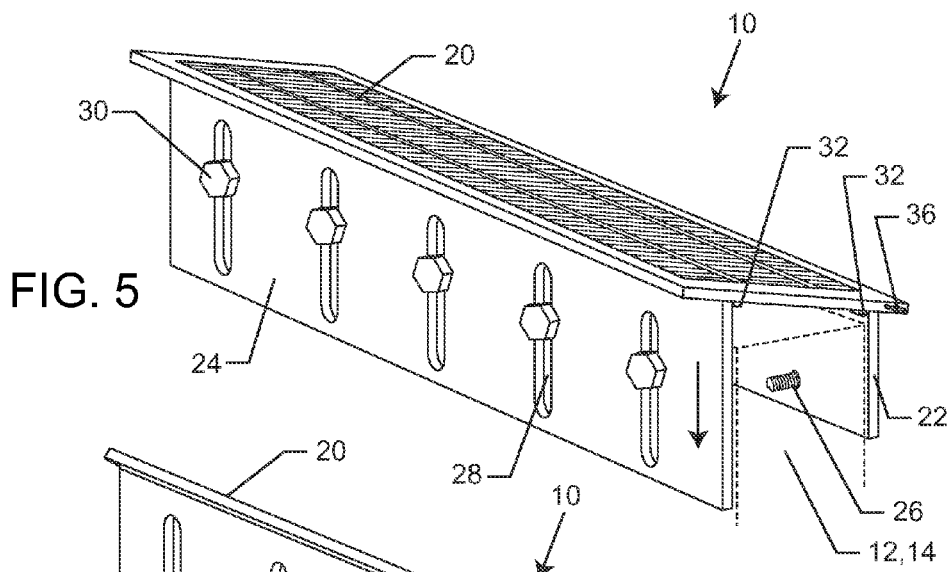
FIG. 5
FIG. 6
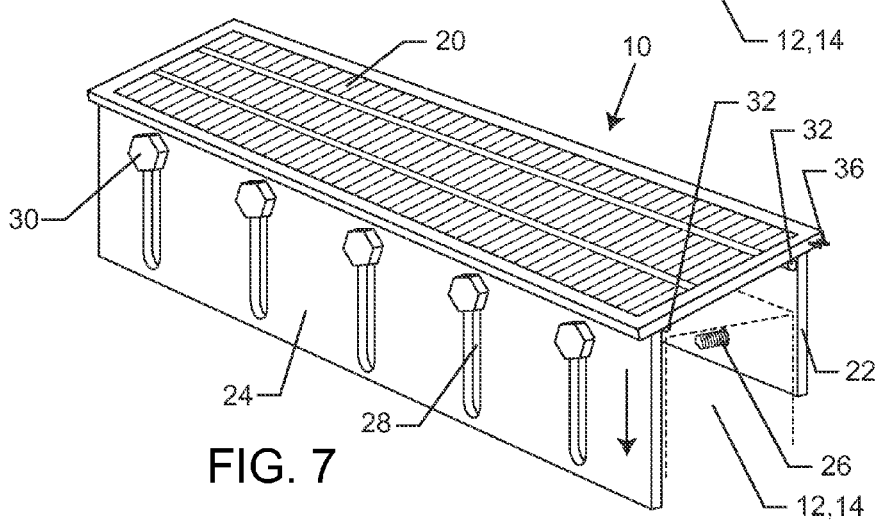
FIG. 7

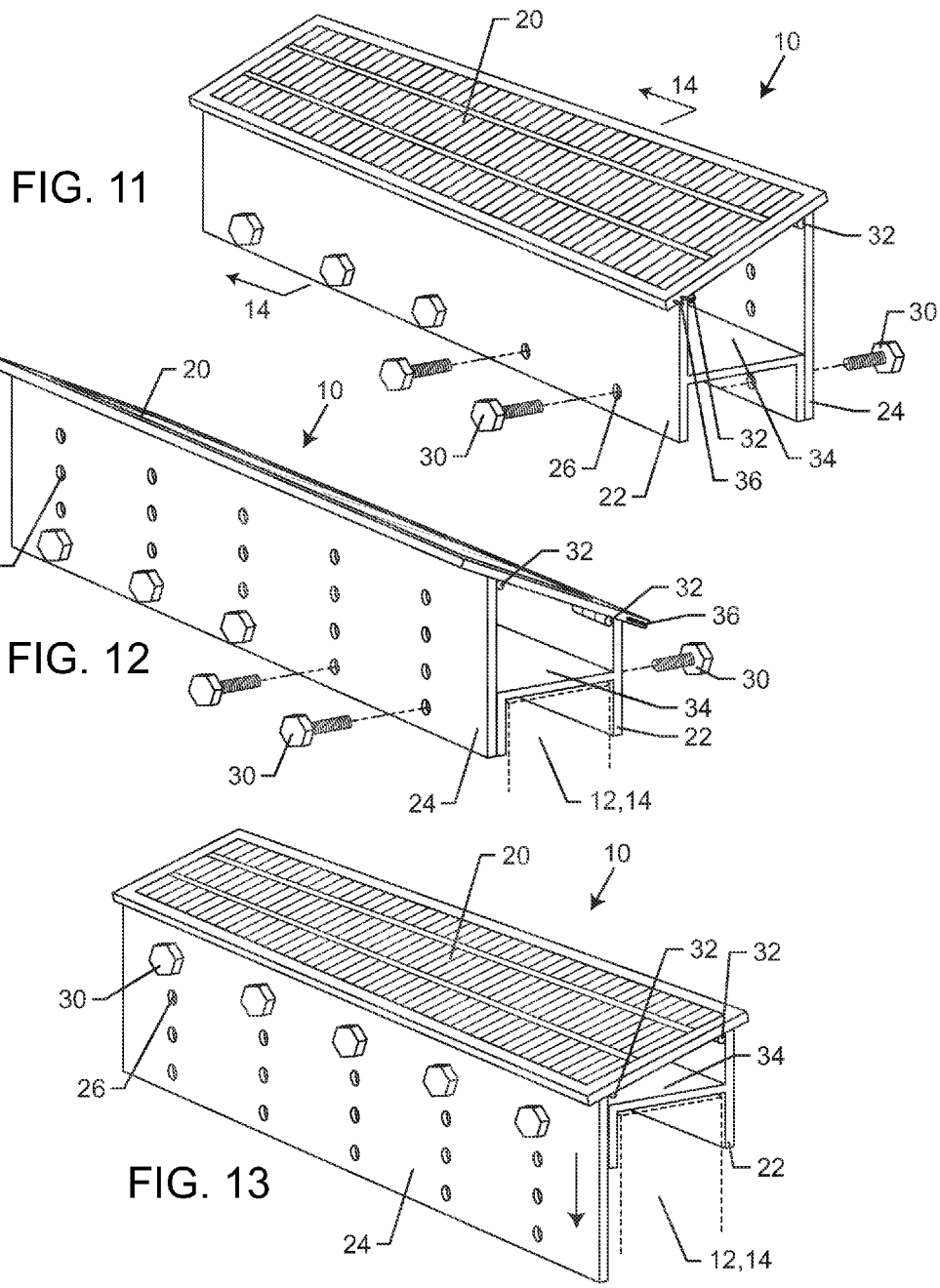

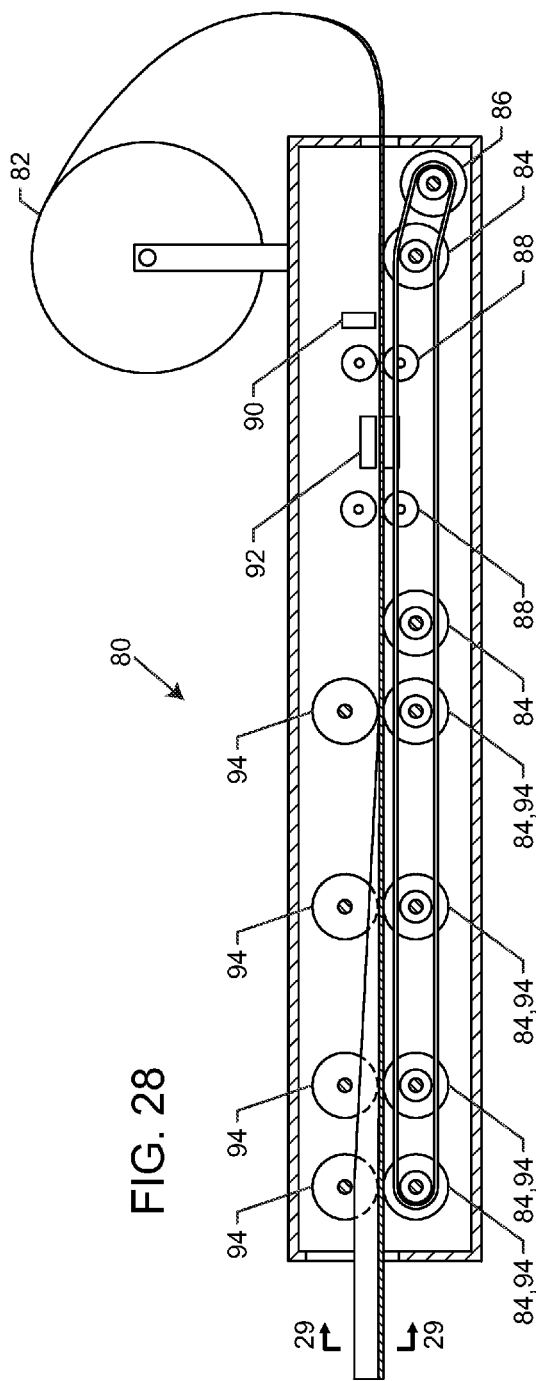
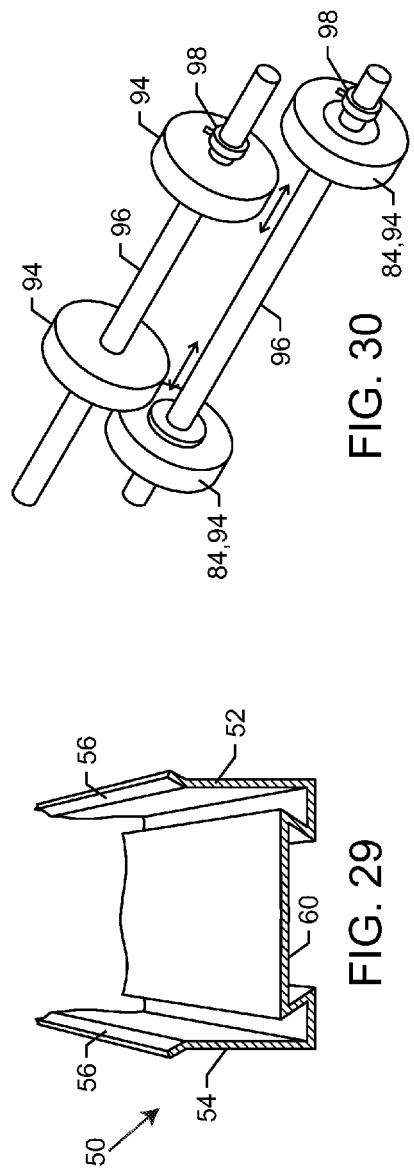
FIG. 28
FIG. 29
FIG. 30

ADJUSTABLE SOLAR PANEL CAP AND METHOD OF MANUFACTURING SAME

FIELD OF THE INVENTION

The present invention generally relates to solar panels. More particularly, the present invention relates to an adjustable solar panel which is attachable to a parapet or a wall for the operation of various electrically powered devices.

BACKGROUND OF THE INVENTION

Many buildings all across the world have a parapet. A parapet is a wall-like barrier at the edge of a roof, terrace, balcony or other structure. When extending above a roof, it may simply be the portion of an exterior wall that continues above the line of the roof surface, or may be a continuation of a vertical feature beneath the roof such as a fire wall or party wall. Historically, parapets were originally used to defend buildings from military attack, but today they are primarily used for preventing the spread of fires or for aesthetic reasons. The word parapet comes ultimately from the Italian parapetto (parare=to cover/defend and petto=breast).

Plain parapets are upward extensions of the wall, sometimes with a coping at the top and corbel below. A parapet may be used to hide a sloping roof or installed exhaust equipment. Alternatively, many firewalls are required to have a parapet, a portion of the wall extending above the roof. The parapet is required to be as fire resistant as the lower wall. It is required to extend at least 30 inches above the roof. If the roof slopes at a rate of 2 in 12 or greater (16.7 percent slope), the parapet shall extend to the same width as any portion of the floor within a fire separation distance where protection of wall openings is required, but in no case shall the height be less than 30 inches (762 mm).

Free standing walls are also common structures found throughout the world. A wall may be built as a retaining wall which is usually supporting an amount of land on one side and preventing it from sliding downward. A free standing wall can also be placed along a highway as a sound barrier or to prevent a traffic accident from going beyond the wall or to prevent the accumulation of traffic noise from becoming a nuisance to nearby residences. Whether it is a wall or a parapet, it is often in a location that receives a substantial amount of sun. This area can be optimized for use producing electricity.

Solar panels use light energy (photons) from the sun to generate electricity through the photovoltaic effect (this is the photo-electric effect). A solar panel (photovoltaic module or photovoltaic panel) is a packaged interconnected assembly of solar cells, also known as photovoltaic cells. The solar panel is used as a component in a larger photovoltaic system to offer electricity for commercial and residential applications. The structural (load carrying) member of a module can either be the top layer (superstrate) or the back layer (substrate). The majority of modules use wafer-based crystalline silicon cells or a thin-film cell based on cadmium telluride or silicon. Crystalline silicon, which is commonly used in the wafer form in photovoltaic (PV) modules, is derived from silicon, a commonly used semi-conductor. Because a single solar panel can only produce a limited amount of power, many installations contain several panels. This is known as a photovoltaic array. A photovoltaic installation typically includes an array of solar panels, an inverter, batteries and interconnection wiring.

Solar panels/arrays are commonly installed on the roof of a residential or commercial property to take advantage of the usable real estate on rooftops. Solar panels are used to generate power for the building they are installed upon and necessarily cover a large amount of surface area to generate enough usable power. Solar panel installation is typically professional installed and is therefore quite labor intensive and expensive.

There are many applications where even a small amount of solar power would be beneficial to provide for landscape lighting, motion sensor lighting, or other general electricity needs which does not require a large and costly solar panel/array installation. Also, there is a need to utilize all the available real estate possible to collect light for solar power whether it is used outside or inside. A parapet or a free standing wall is a common location which can be optimized to produce electricity.

Accordingly, there is a need for an easily installable solar panel to be attached upon a ledge which can be configured to power various electrical needs, such as lighting during the night. The present invention fulfills these needs and provides other related advantages.

SUMMARY OF THE INVENTION

The present invention relates to an adjustable solar panel cap for attachment to a parapet or wall. The adjustable solar panel cap includes a mounting bracket attachable to an upper end of the parapet or wall, and a solar panel fixed to the mounting bracket.

The mounting bracket may include a locking channel for slidably receiving and retaining at least a portion of the solar panel therein or, additionally, the mounting bracket may include a fixed mount and a slidable mount which permit the solar panel to be adjustably positionable relative to the mounting bracket. A horizontal support may also be provided which is positionable over the upper end of the parapet or wall. Pivot hinges are typically provided for connecting the solar panel to the mounting bracket.

The solar panel may comprise a plurality of solar panels wherein adjacent solar panels are electrically connected together. One or more electrically powered devices may be electrically connected to the solar panel or solar panel array. The electrically powered devices may comprise a streetlight, a building light, a battery, an outdoor electrical device, or at least one light cap attachable to the upper end of the parapet or wall.

In an alternate embodiment, an adjustable solar panel system for attachment to a parapet or wall is provided. The system includes a fixed coping and a solar panel cap attached thereto. The fixed coping comprises oppositely disposed vertical supports. The fixed coping is configured for attachment to a top of the parapet or wall such that the pair of vertical supports is biased against sides of the parapet or wall. The solar panel cap has a generally horizontal base and a generally angled solar panel. A first edge of the solar panel is pivotally attached to a first edge of the horizontal base. A first support plate is pivotally attached to an opposite second edge of the horizontal base and a second support plate is pivotally attached to an opposite second edge of the solar panel. The first and second support plates overlap each other and are configured for removable attachment to each other across a plurality of positions.

The system further comprises a locking channel on the fixed coping and a locking insert on the solar panel cap. The locking channel is configured to slidably receive the locking insert so as to securably attach the solar panel cap to the fixed coping. The angled solar panel is adjustably positionable relative to the horizontal base of the solar panel cap. The angled solar panel preferably comprises a plurality of solar panels, wherein adjacent solar panels are electrically connected together.

The system may include one or more electrically powered devices electrically connected to the solar panel. The electrically powered devices preferably comprise a street light, a building light, a battery, or an outdoor electrical device. The electrically powered devices preferably comprise at least one light cap attachable to the fixed coping.

The first edge of the angled solar panel is preferably pivotally connected to the first edge of the horizontal base by a hinge. The pivotal connection of both the first support plate to the horizontal base and the second support plate to the angled solar panel is preferably also by hinge. A connection means on the first support plate and a mating connection means on the second support plate cooperate to attach a first support plate to the second support plate in one of the plurality of positions. The connection means and the mating connection means preferably comprise a plurality of overlapping holes on each of the first and second support plates, such holes configured to receive a set pin or screw.

A process for manufacturing a seamless coping for attachment to a top of a wall or parapet is disclosed. The process includes measuring a width and length of the top of the wall or parapet. A metal forming machine is provided, the machine having adjustable pairs of forming rollers to bend and shape a metal material. A lateral spacing of the pairs of forming rollers on the machine is adjusted such that the lateral spacing corresponds to the width of the top of the parapet or wall. A length of flat metal material is fed into the metal forming machine. The flat metal material is shaped into a predetermined shape so as to form the seamless coping using the pairs of forming rollers. The overall length of metal material fed into the metal forming machine is sensed or detected, and the metal material is cut when the sensed length of the metal material equals the measured length of the top of the parapet or wall.

The shaping step preferably includes the step of forming a locking channel along the length of the flat metal material. The locking channel is preferably formed generally along a centerline of the length of the flat metal material. The process includes bending side edges of the length of the flat metal material so as to form opposing resilient metal supports. A distance between the opposing resilient vertical supports is preferably less than or equal to the measured width of the top of the parapet or wall.

The process includes flaring a bottom edge of the opposing resilient vertical supports away from a centerline of the length of flat metal material. The cut metal material is removed from the metal forming machine, providing a seamless coping configured to fit the length of the top of the parapet or wall.

A process for attaching an adjustable solar panel cap to a parapet or wall begins with manufacturing a seamless coping for attachment to a top of the parapet or wall according to the process described above. A locking insert on the solar panel cap is attached to a locking channel formed on the seamless coping. An angle of a solar panel on the solar panel cap is adjusted by pivoting the solar panel relative to a horizontal base of the solar panel cap. A first support plate on the horizontal base is attached to a second support plate on the solar panel so as to fix the angle of the solar panel.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 5 is a view similar to FIG. 4, now showing adjustability of the panel downward;

FIG. 6 is a view similar to FIG. 5, now showing adjustability of the panel upward;

FIG. 7 is a view similar to FIG. 5, now showing adjustability of the panel downward;

FIG. 11 is a front perspective view of the embodiment similar to FIG. 2 with a parapet support;

FIG. 12 is a back perspective view of the embodiment of FIG. 11;

FIG. 13 is a rear perspective view of FIG. 12, now showing adjustability of the panel downward;

FIG. 28 shows a rolled metal forming machine for forming a seamless coping;

FIG. 29 shows a cross-sectional view of the formed metal coping along line 29-29 of FIG. 28; and FIG. 30 is a close-up view of forming rollers in the machine of FIG. 28.

DETAILED DESCRIPTION OF THE PREFERRED EMBODIMENTS

Figure 1:
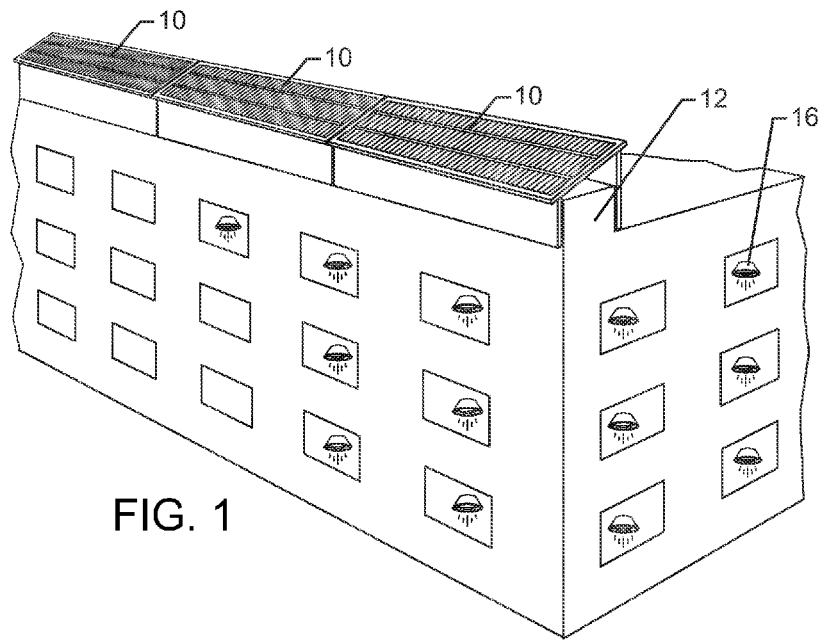
FIG. 1 is a perspective view of an exemplary adjustable solar panel cap embodying the present invention installed on a building's parapet.
Figure 2:
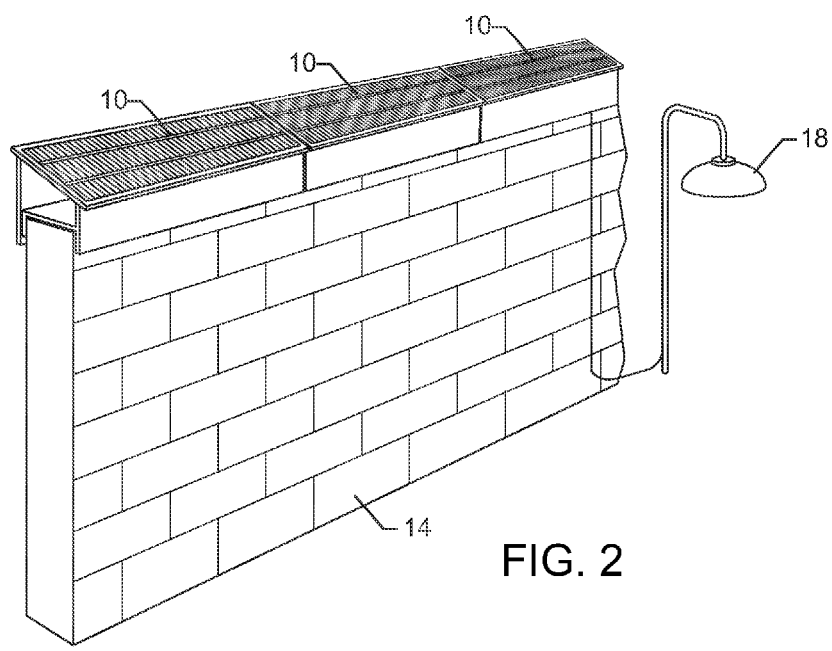
FIG. 2 is a perspective view of another exemplary adjustable solar panel cap embodying the present invention installed on a retention wall.
Figure 3:
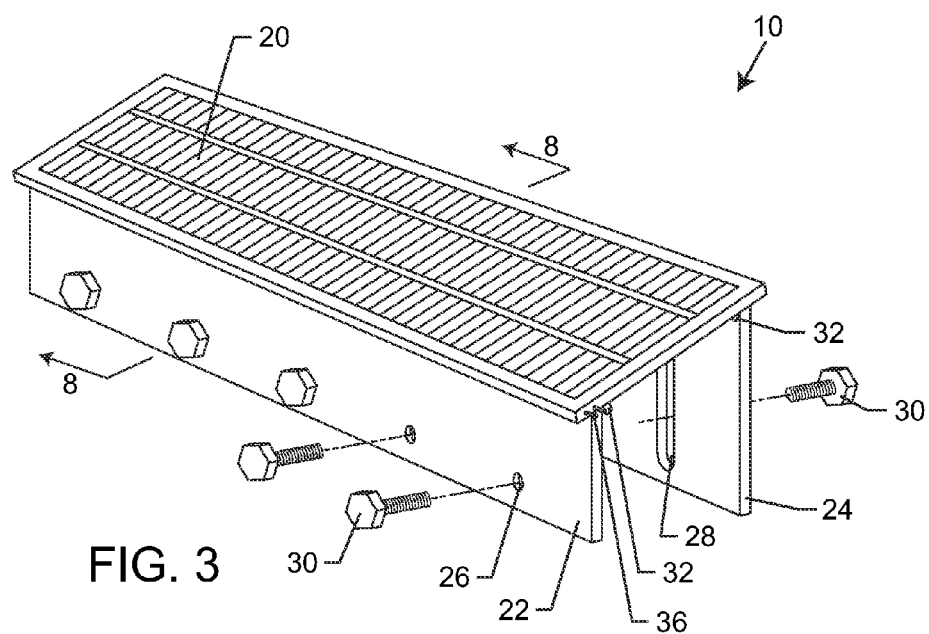
FIG. 3 is a front perspective view of the embodiment similar to FIG. 1.

As shown in the drawings for purposes of illustration, the present invention for an adjustable solar panel cap is referred to generally by the reference number 10. FIG. 1 is a perspective view of an exemplary adjustable solar panel cap 10 embodying the present invention installed on a building's parapet 12. FIG. 2 is a perspective view of another exemplary adjustable solar panel cap 10 embodying the present invention installed on a retention or free-standing wall 14. In FIG. 1, the solar panel cap 10 is configured to produce electricity for the building's lights 16. In FIG. 2, the solar panel cap 10 is configured to produce electricity for the street light 18. It is to be understood by one skilled in the art that the solar panel cap 10 can produce electricity for a variety of electronic devices and is not to be limited to the precise forms shown and described herein.

FIGS. 1 and 2 both show three sets of solar panel caps 10 installed. It is to be understood that each solar panel cap 10 can be electrically coupled to an adjacent solar panel cap 10 such that each individual solar panel cap 10 works together as a single unit. This allows additional solar panel caps 10 to be installed and simply connected to the adjacent solar panel cap 10. In this way, a long stretch of parapet 12 or wall 14 can be fully utilized to produce electricity.

FIGS. 3-10 show an exemplary adjustable solar panel cap 10 embodying the present invention. Due to the solar panel caps 10 being installed in various high risk locations, it is critical that they do not fall or blow off in the wind. For instance, placing a device onto a parapet 12 is extremely dangerous if the parapet 12 or the device falls to the ground below. This means that people can be seriously injured or even killed. Also, if the solar panel cap 10 is located along a sound barrier adjacent to a highway, it is critical that the solar panel cap 10 remain in place in spite of harsh weather conditions or else the solar panel cap 10 can fall into traffic and create a serious wreck and injury.

Figure 4:
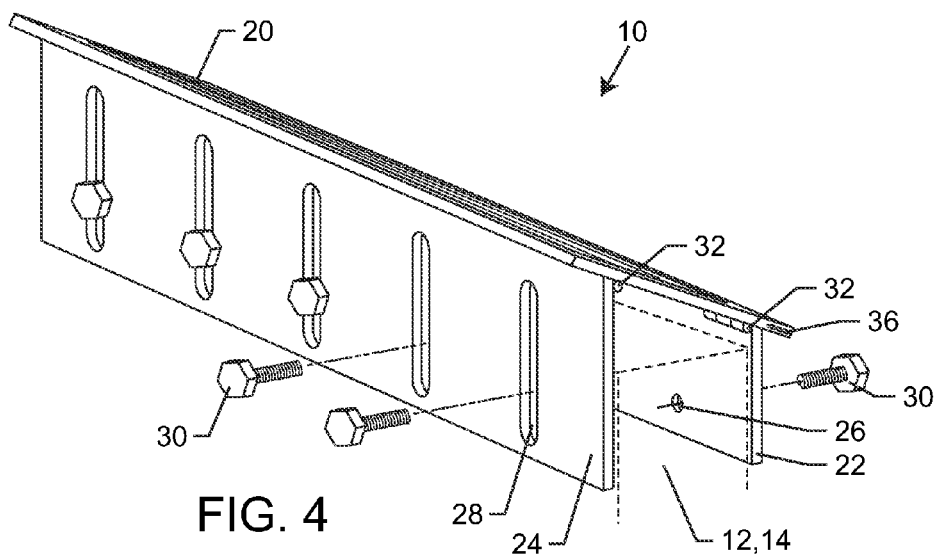
FIG. 4 is a rear perspective view of the embodiment of FIG. 3.
Figure 8:
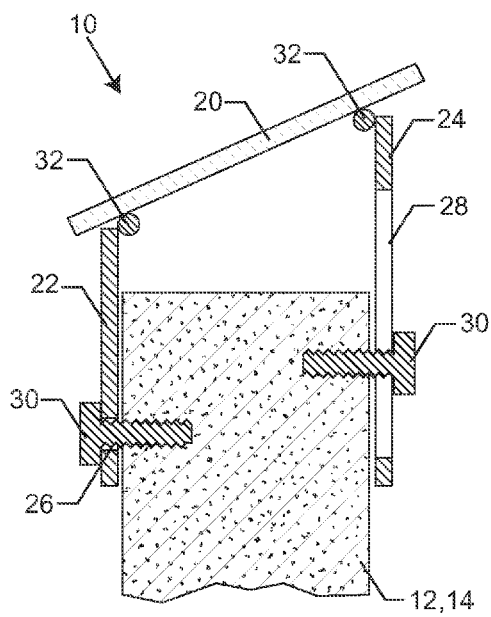
FIG. 8 is a sectional view taken along line 8-8 from FIG. 3, showing the configuration of parts in FIG. 6.
Figure 9:
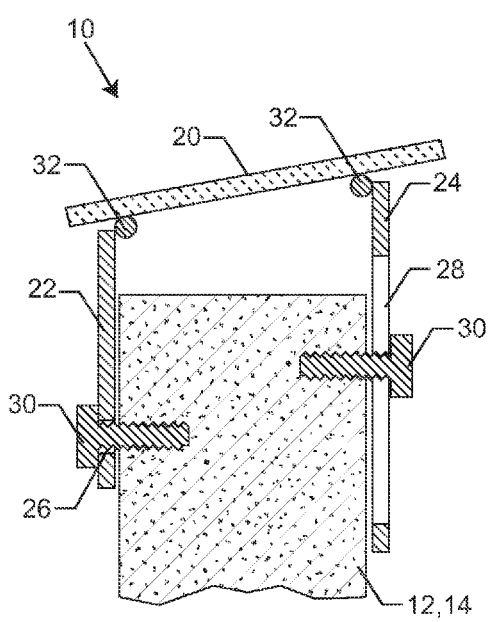
FIG. 9 is similar to FIG. 8, illustrating the configuration also shown in FIG. 5.
Figure 10:
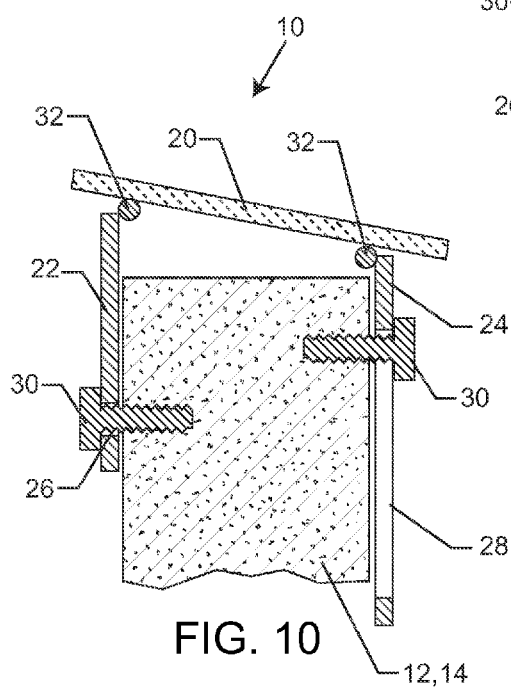
FIG. 10 is a sectional view similar to FIGS. 8 and 9, illustrating the configuration also shown in FIG. 7.
Figure 14:
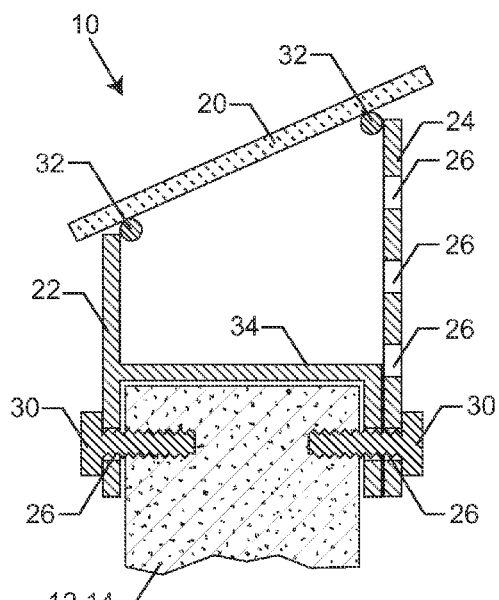
FIG. 14 is a sectional view taken along line 14-14 of FIG. 11.
Figure 15:
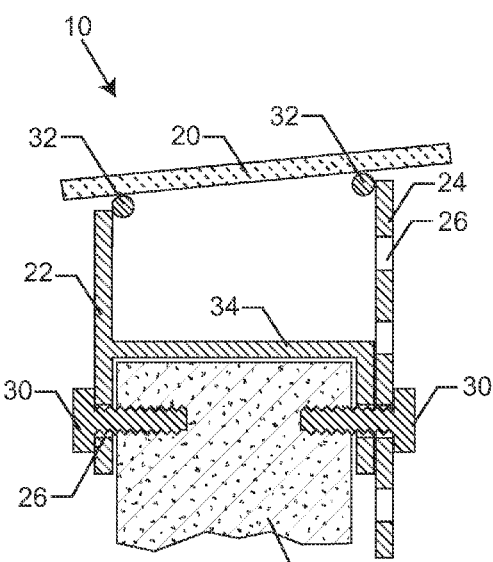
FIG. 15 is another sectional view similar to FIG. 14, now with the panel lowered.
Figure 16:
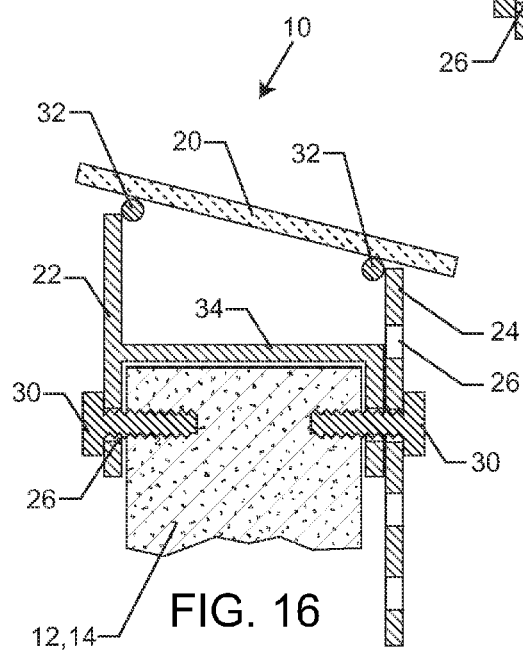
FIG. 16 is another sectional view similar to FIG. 14, now with the panel lowered even further.

The adjustable solar panel cap 10 includes a solar panel section 20 which is pivotably connected to two sides; a fixed mount 22 and a slidable mount 24. Within the fixed mount 22 are holes 26 and within the slidable mount 24 are slots 28. Both the fixed mount 22 and slidable mount 24 are pivotably connected to the solar panel section 20 at hinges 32. As shown in FIG. 4, the solar panel cap 10 is placed over a parapet 12 or wall 14. A screw 30 is then fed through the hole 26 in the fixed mount side and attached permanently to the parapet/wall 12,14. Now a second screw 30 may be fed through the slot 28 of the slidable mount 24.

The slidable mount 24 is able to move up and down relative to the parapet/wall 12, 14. This then changes the angle of the solar panel section 20 as best shown in FIGS. 5-10. Once a desired angle of the solar panel section 20 is achieved, the screws may be tightened thereby permanently securing the angle. The present invention allows the angle of the solar panel section 20 to be adjustable as setting an optimum angle produces the most amount of electricity. Depending on the climate of the parapet 12 or wall 14, and depending on the exact configuration of the parapet 12 or wall, adjustability of the solar panel section 20 is critical to optimizing the electricity produced.

FIGS. 11-16 show another exemplary embodiment of an adjustable solar panel cap 10. Now the fixed mount 22 includes a horizontal support 34 that is designed to fit over and capture a parapet 12 or wall 14. The support 34 is designed to be placed on a parapet 12 or wall 14 and not fall over or require a set of hands to hold it in place while it is being secured. Before a single screw 30 is fastened, the solar panel cap 10 can be placed upon the parapet 12 or wall 14 without the use of additional hands or supports to hold it in place. This effectively simplifies the installation process as a single worker can now install each individual screw 30 at their discretion.

The embodiment of FIGS. 11-16 is easier to install as compared to the embodiment of FIGS. 3-10. However, each embodiment includes a fixed mount 22 and a slidable mount 24 such that the solar panel section 20 can be adjusted before it is fastened into a permanent position. In the embodiment of FIGS. 11-16, the slidable mount 24 is now comprised of a plurality of holes 26 such that height can be adjusted by selecting various holes 26. It is to be understood by one skilled in the art that a slot 28 can also be used.

Various figures also show how each solar panel cap 10 can include an adjacent electrical connector 36 such that adjacent panels can be connected in series. This can ease installation and also generate a significant amount of energy when multiple solar caps 10 are used. Also, a battery can be electrically coupled to the solar panel cap 10 such that energy can be gathered and stored during daylight hours and then used later during the night.

Figure 17:
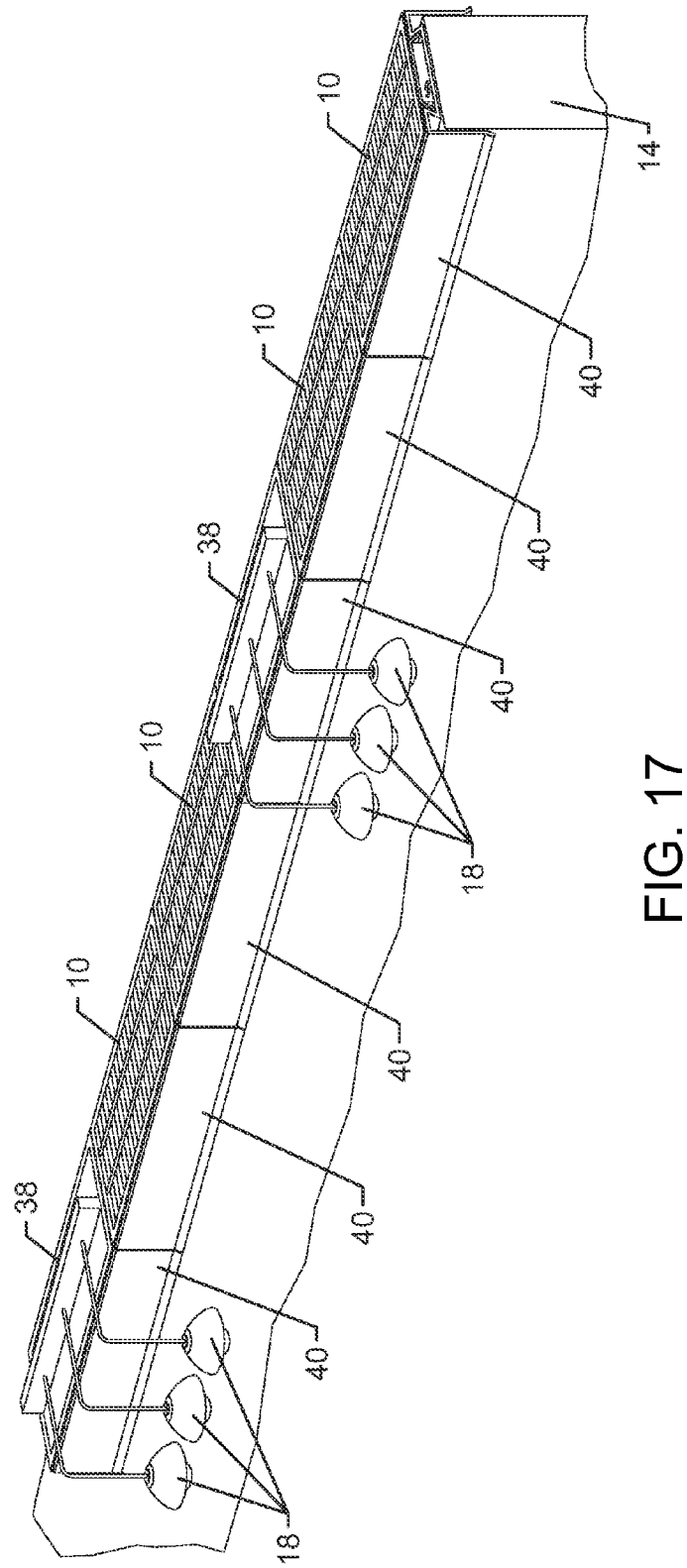
FIG. 17 is a perspective view of an exemplary plurality of solar panel caps and light caps embodying the present invention installed on a retention wall.
Figure 18:
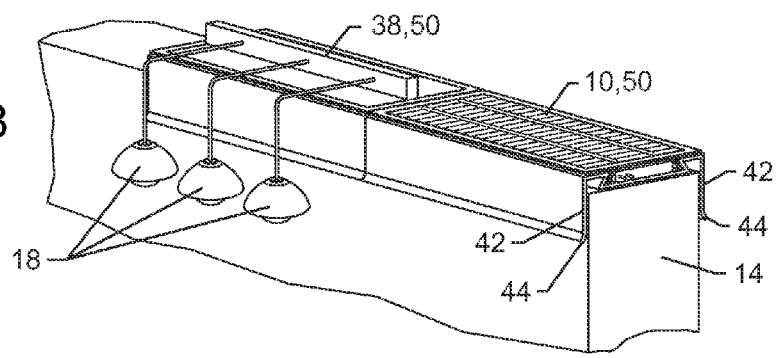
FIG. 18 is a perspective view similar to the structure of FIG. 17, now showing a single solar panel cap and light cap.
Figure 19:
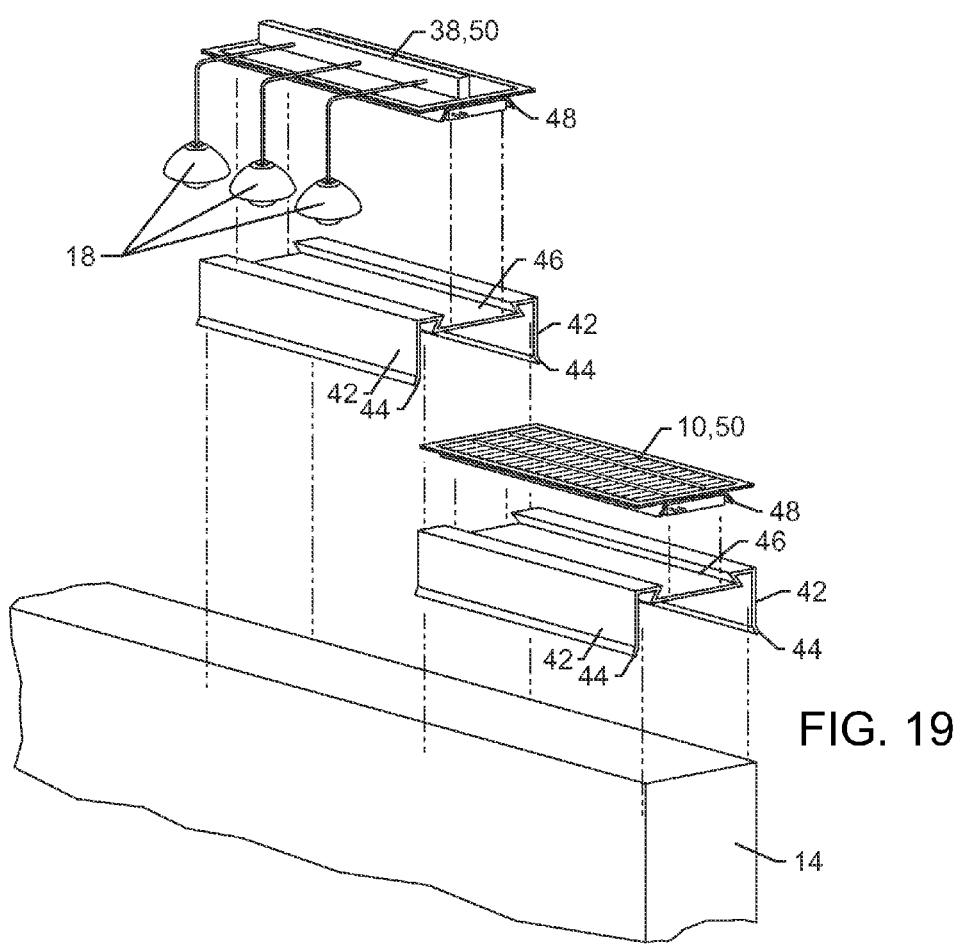
FIG. 19 is an exploded view of the structure of the FIG. 18.
Figure 20:
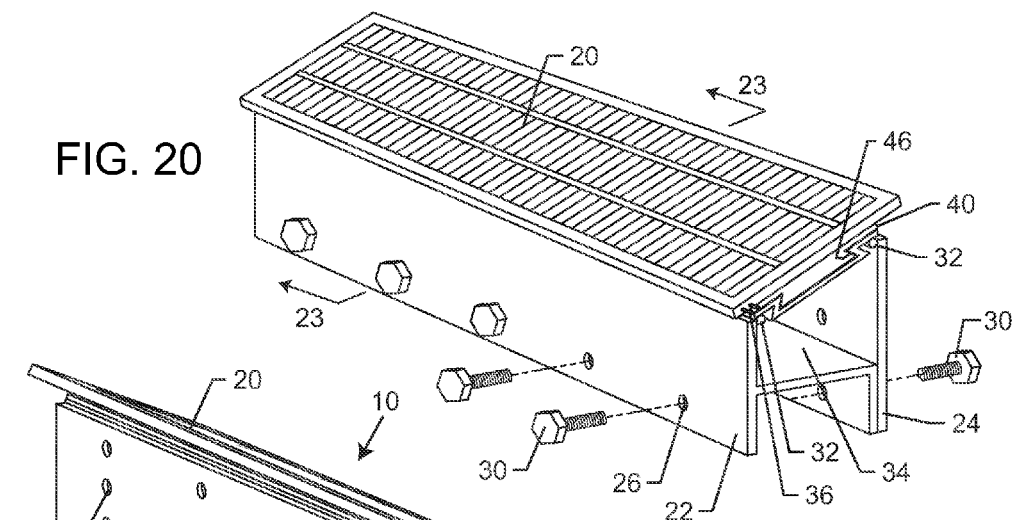
FIG. 20 is a front perspective view of an alternate embodiment that combines features of the embodiments shown in FIGS. 11-16 with the features of FIGS. 17-19.
Figure 21:
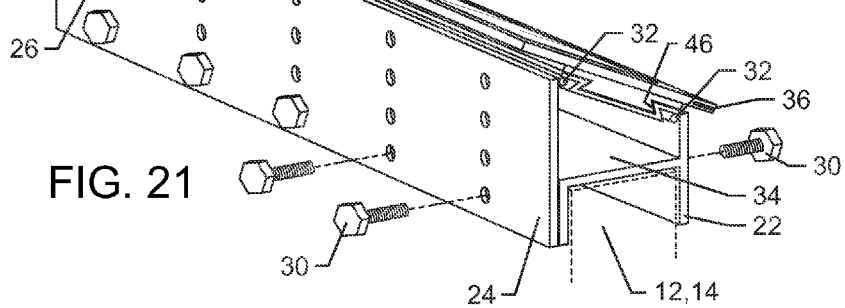
FIG. 21 is a rear perspective view of the embodiment of FIG. 20.
Figure 22:
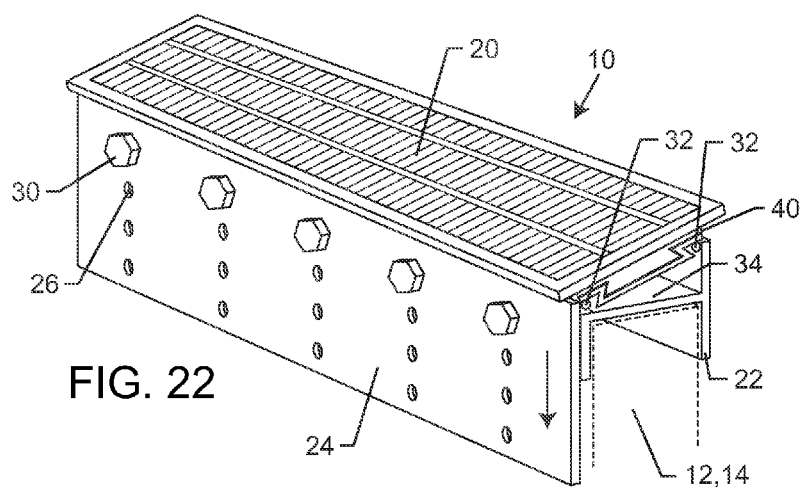
FIG. 22 is a rear perspective view of FIG. 21, now showing adjustability of the panel downward.
Figure 23:
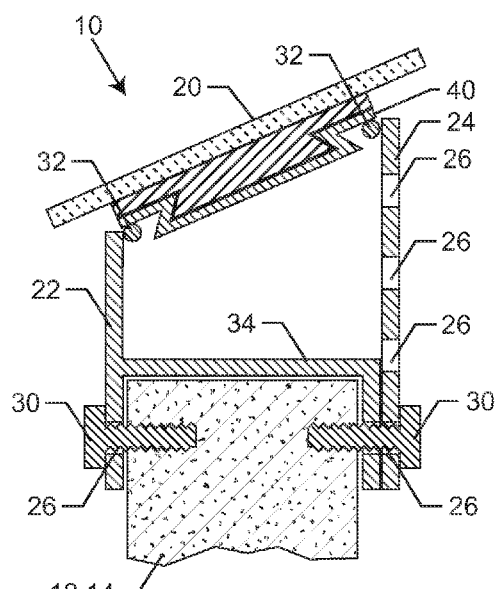
FIG. 23 is a sectional view taken along line 23-23 of FIG. 20.
Figure 24:
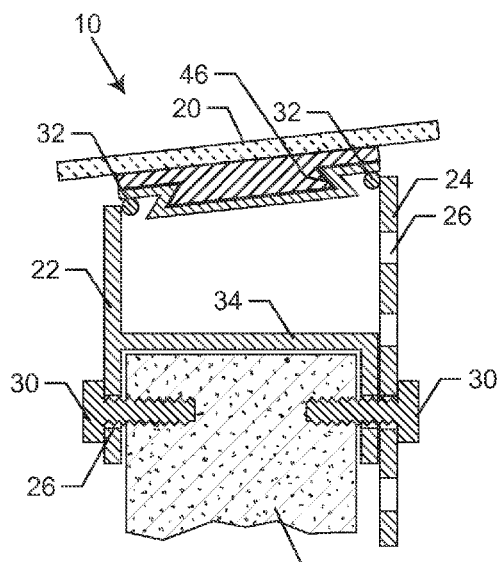
FIG. 24 is another sectional view similar to FIG. 23, now with the panel lowered.
Figure 25:
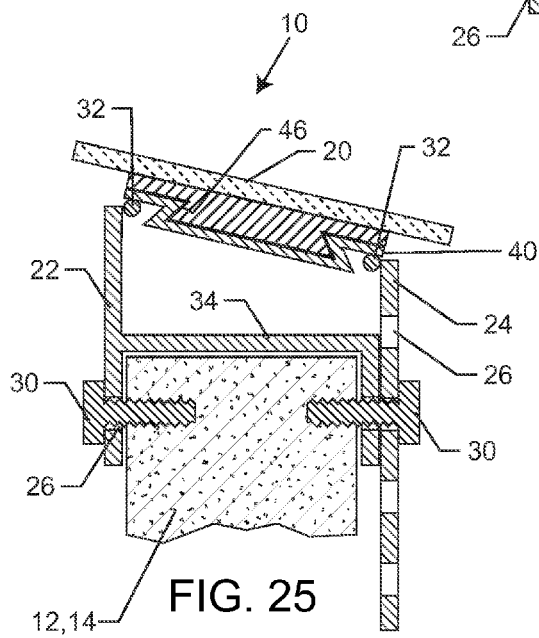
FIG. 25 is another sectional view similar to FIG. 23, now with the panel lowered even further.

FIG. 17 is a perspective view of another exemplary plurality of solar panel caps 10 and light caps 38 embodying the present invention installed on a wall 14. FIG. 18 is a perspective view similar to the structure of FIG. 17 now showing a single solar panel cap 10 and light cap 38. FIG. 19 is an exploded view of the structure of the FIG. 18.

FIGS. 17-19 illustrate another method of easily attaching a multitude of solar panel caps 10 and light caps 38 such that installation is extremely easy and quick. Due to the solar panel caps 10 being installed in various high risk locations, it is critical that they do not fall or blow off in the wind. For instance, placing a device onto a parapet 12 is extremely dangerous if the parapet 12 or the device falls to the ground below. This means that people can be seriously injured or even killed. Also, if the solar panel cap 10 is located along a sound barrier adjacent to a highway, it is critical that the solar panel cap 10 remain in place in spite of harsh weather conditions or else the solar panel cap 10 can fall into traffic and create a serious wreck and injury. However, it is also desired that installation can be accomplished quickly without the need to drill holes and use bolts and nuts to securely fasten the devices. Also, it is desired that unskilled labor can be used and the design is free from possible installation errors.

To accomplish these goals, a common bracket 40 is used to attach both the solar panel caps 10 and light caps 38. In an exemplary embodiment the bracket 40 may be designed to fit snuggly over a wall 14 by the use of two vertical extensions 42. The vertical extensions 42 extend well below the center of the bracket 40 and run along the entire longitudinal length of the bracket 40. The bracket 40 can be made of a resilient material, such as metal, which therefore allows the extensions 42 to act as springs. This is accomplished by making the distal ends 44 of the extensions 42 slightly smaller than the wall 14 it is being installed on. When the bracket 40 is forced upon a wall 14, the material of the bracket 40 will bend at the juncture between the extension arm 42 and the center of the bracket 40.

To also keep the bracket 40 installed along the wall 14, the extensions 42 must be sufficiently long such that they prevent the bracket 40 from being blown off or falling off. The longer the extensions 42, the harder it will be for the bracket 40 to fall off the wall 14. As discussed in previous embodiments, fastening means may also be used to permanently attach the brackets 40 to the wall 14.

Each bracket has a center section which includes a locking channel 46. The locking channel 46 is designed to securely retain a matching corresponding end 48. The end 48 is designed to slip within the channel 46 from the side. Once the end 48 is within the channel 46, the end 48 cannot separate from the channel 46 in the vertical direction.

Both the solar panel cap 10 and light cap 38 have the matching end 48 along their bottom surface. This means that either the solar panel cap 10 or light cap 38 can be used with the common bracket 40. Having a common bracket 40 for both the solar panel cap 10 and light cap 38 aides in the ease of installation and reduces overall costs.

It is to be understood that each solar panel cap 10 can be electrically coupled to an adjacent solar panel cap 10 or light cap 38 such that each individual solar panel cap 10 works together with other solar panel caps 10 and light caps 38 as a single unit. This allows additional solar panel caps 10 and light caps 38 to be installed and simply connected to an adjacent cap 10, 38. In this way, a long stretch of parapet 12 or wall 14 can be fully utilized to produce electricity.

It is to also be understood by one skilled in the art that each light cap 38 may include a multitude of street lights 18. Furthermore, either the solar panel cap 10 or light cap 38 may include a rechargeable battery 50 that stores energy collected during daylight hours to then be used during the night.

FIGS. 20-25 show another exemplary embodiment of an adjustable solar cap 10. This particular embodiment is essentially a combination of the embodiment shown in FIGS. 11-16 incorporated with the structure shown in FIGS. 17-19. In this regard, the fixed mount 22 includes a horizontal support 34 that is designed to fit over and capture a parapet 12 or wall 14. As was the case in the embodiment of FIGS. 11-16, this effectively simplifies the installation process as a single worker can now install each individual screw 30.

In the embodiment of FIGS. 20-25, the common bracket 40 includes a locking channel 46 and is attachable to the fixed mount 22 and slidable mount 24 by means of hinges 32. In this manner, the angle of the solar panel may be adjusted by selecting the position of the slidable mount relative to the horizontal support 34, all in much the same manner as the embodiment of FIGS. 11-16.

Of course, each solar panel can include an adjacent electrical connector 36 such that adjacent panels can be connected in series. As in other embodiments, this can ease installation and also generate a significant amount of energy when multiple solar caps 10 are used. Further, a battery can be electrically coupled to the solar panel cap 10 such that energy can be gathered and stored during daylight hours and then used later during the night.

Figure 26:
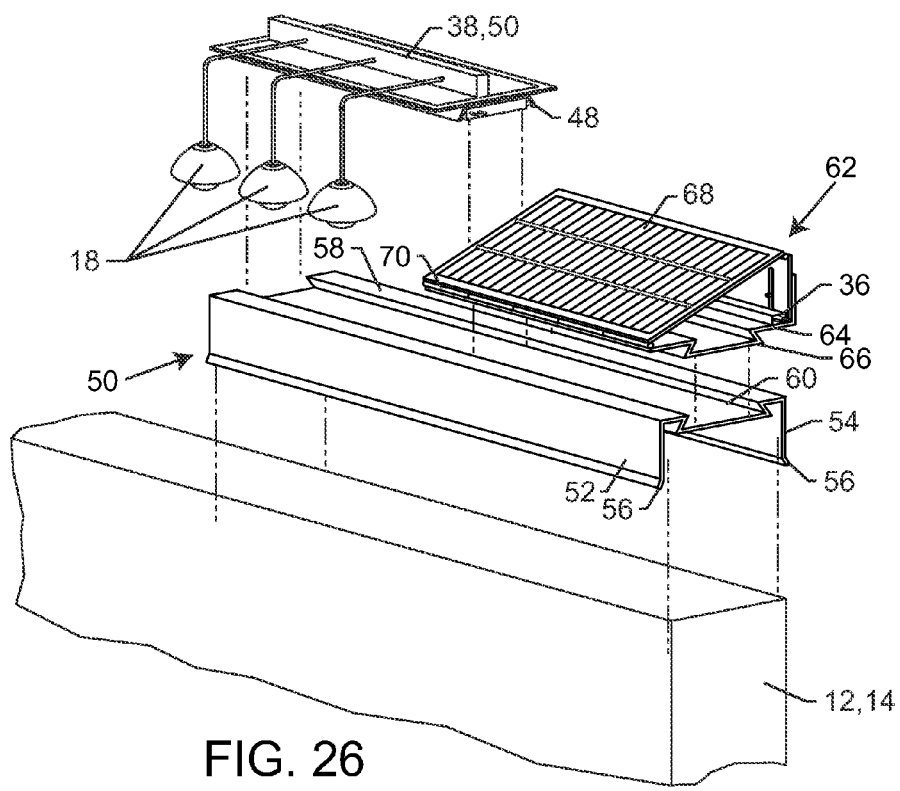
FIG. 26 is an exploded perspective view of an alternate embodiment of the solar panel caps and light caps of the present invention.
Figure 27:
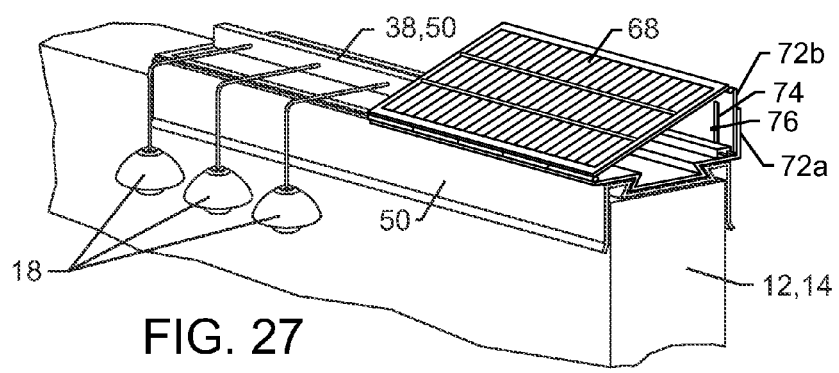
FIG. 27 is an assembled perspective view of the structure of FIG. 26.

FIGS. 26 and 27 illustrate an alternate embodiment of the solar panel caps and coping or solar panel system. Whereas FIGS. 17-25 illustrated a configuration where the solar panel cap 10 was of a fixed configuration and the coping or bracket 40 was of adjustable configuration, the embodiment of FIGS. 26 and 27 reverses this feature.

The fixed coping 50 has a generally rectangular cross-section configured to fit over the top of a parapet 12 or wall 40. The fixed coping 50 has a first vertical support 52 and a second vertical support 54 disposed on opposite sides. Each vertical support 52, 54 preferably includes a flared tail 56 such that the coping 50 may be more easily slipped over the top of the parapet 12 or wall 14. The vertical supports 52, 54 are configured so as to fit over and capture or grab the parapet 12 or wall 14 as by a resilient or biasing force.

An upper horizontal surface 58 connects the vertical supports 52, 54 and includes a locking channel 60 configured similar to the locking channel 46 described above. The vertical supports 52, 54 are permanently and fixedly connected to opposite edges of the horizontal surface 58 so as to be generally permanently configured in the manner described. Preferably, the vertical supports 52, 54 extend sufficiently down either side of the parapet 12 or wall 14 so as to ensure a secure attachment of the coping 50 thereto.

The solar panel cap 62 preferably has a generally triangular cross-section having a lower horizontal base 64. The horizontal base 64 includes a locking insert 66 configured to be slidably received within the locking channel 60 of the coping 50. The locking insert 66 and locking channel 60 are configured to function as the locking channel 46 and end 48 described above.

The solar panel cap 62 further includes an angled solar panel 68 that is pivotally attached to an edge of the lower horizontal base 64 by a hinge 70 or similarly resilient structure. Various hinges may be used, including barrel hinges, pivot hinges, butt/mortise hinges, continuous hinges, strap hinges, or any other type of hinge commonly used in the art. The opposite side edges of the horizontal base 64 and angled solar panel 68 each have a support plate 72A, 72B pivotally attached thereto by a hinge 70 or similarly resilient structure.

The support plates 72A, 72B are configured to cooperatively support one side of the angled solar panel 68 a set distance above the horizontal base 64. Preferably, the support plates 72A, 72B have mating connection mechanisms for securing them together such as a series of overlapping holes 74 configured to be engageable in a plurality of positions. A set pin or screw 76 may be inserted in one or more of the holes 74 so as to lock the solar panel 68 at a predetermined angle above the horizontal base 64. The mating connection mechanisms may come in other forms including brackets and/or channels to receive part of the other support plate or a ridge attached thereupon. The mating connection mechanisms may also comprise magnets or other similar connection devices known in the art. In this way, the angle of the solar panel may be adjusted relative to the position of the sun. As with the earlier embodiments, the solar panel cap 62 includes an electrical connector 36 to connect with adjacent panels or light caps.

FIG. 28 illustrates a rolled metal forming machine 80 typically used to shape and fold flat metal into desired configurations. The machine 80 uses a roll of flat stock material 82, usually light gage steel or aluminum. A pair of drive rollers 84 feed the roll of material 82 through the machine 80. The drive rollers 84 are preferably driven by a motor 86. The machine 80 includes guide rollers 88 and a sensor 90 to measure the length of material 82 passing through the machine 80. The machine 80 further includes a cutting mechanism 92 configured for creating the desired profile on the end of a piece of material 82 to be machined, as well as cut the machined material from the rest of the roll 82 once the desired length is prepared. The cutting mechanism 92 may take the form of a punch and die, a shear, a CNC mill, a laser, or other common cutting method known in the art.

The machine 80 continues with a plurality of forming rollers 94 configured to bend and shape the material from the roll 82 into a desired shape. A person of ordinary skill in the art will appreciate how these forming rollers 94 may be configured to bend the material and achieve the desired shape. FIG. 29 illustrates the bent and shaped coping as it exits the machine 80. Note that it is upside down such that the sides 52, 54 do not interfere with the drive rollers 84.

The lateral spacing of the forming rollers 94 is preferably adjustable such that the width of the formed material can be adjusted across a range. Specifically, in the case of the fixed coping 50 formed by the machine 80, the forming rollers 94 can be adjusted such that the horizontal surface 58 can cover a range of widths, such as from four inches to sixteen inches or more depending upon the width of the parapet 12 or wall 14. As illustrated in FIG. 30, the adjustment of the forming rollers 94 may be achieved by releasably sliding the pairs of forming rollers 94 along a set or guide rod 96. One or both pairs of forming rollers 94 on each guide rod 96 may be slidably adjustable and fixed in position as by set screw, locking pin or similar mechanism 98. The set screw 98 allows for more fine tuning in the selection of a desired width.

Continuous operation of the machine 80 allows for the creation of a fixed coping 50 having an indeterminate length so as to provide a continuous coping 50 along an entire length of the parapet 12 or wall 14. Such a continuous length of coping 50 provides for greater stability and fixed attachment to the parapet 12 or wall 14. One need only operate the cutting mechanism 92 once the desired length has been measured by the length sensor 90. Such a method provides for a seamless coping 50 to be attached to the parapet 12 or wall 14.

Although several embodiments have been described in detail for purposes of illustration, various modifications may be made without departing from the scope and spirit of the invention. Accordingly, the invention is not to be limited, except as by the appended claims.

What is claimed is:

1. An adjustable solar panel system for attachment to a parapet or wall, comprising:
    a fixed coping comprising oppositely disposed vertical supports, the fixed coping configured for attachment to a top of the parapet or wall such that the pair of vertical supports are biased against sides of the parapet or wall;
    a solar panel cap attached to the fixed coping, the solar panel cap having a generally horizontal base and a generally angled solar panel, a first edge of the solar panel pivotally attached to a first edge of the horizontal base, a first support plate pivotally attached to an opposite second edge of the horizontal base, and a second support plate pivotally attached to an opposite second edge of the solar panel, the first and second support plates overlapping each other and configured for removable attachment to each other across a plurality of positions.

2. The solar panel system of claim 1, further comprising a locking channel on the fixed coping and a locking insert on the solar panel cap, the locking channel configured to slidably receive the locking insert so as to securably attach the solar panel cap to the fixed coping.

3. The solar panel system of claim 1, wherein the angled solar panel is adjustably positionable relative to the horizontal base of the solar panel cap.

4. The solar panel system of claim 1, wherein the angled solar panel comprises a plurality of solar panels.

5. The solar panel system of claim 4, wherein adjacent solar panels are electrically connected together.

6. The solar panel system of claim 1, including one or more electrically powered devices electrically connected to the solar panel.

7. The solar panel system of claim 6, wherein the electrically powered devices comprise a streetlight, a building light, a battery or an outdoor electrical device.

8. The solar panel system of claim 7, wherein the electrically powered devices comprise at least one light cap attachable to the fixed coping.

9. The solar panel system of claim 1, wherein the first edge of the angled solar panel is pivotally connected to the first edge of the horizontal base by a hinge.

10. The solar panel system of claim 1, wherein the pivotal connection of both the first support plate to the horizontal base and the second support plate to the angled solar panel are by hinge.

11. The solar panel system of claim 1, further comprising a connection means on the first support plate and a mating connection means on the second support plate, wherein the connection means and the mating connection means cooperate to attach the first support plate to the second support plate in one of the plurality of positions.

12. The solar panel system of claim 11, wherein the connection means and mating connection means comprise a plurality of overlapping holes on each of the first and second support plates, such holes configured to receive a set pin or screw.

* * * * *